United States Patent [19]

Thrower

[11] Patent Number: 4,857,914

[45] Date of Patent: Aug. 15, 1989

[54] ACCESS-CONTROL APPARATUS

[76] Inventor: Keith R. Thrower, Old Cedar, 12 Wychcotes, Caversham, Reading, RG4 7DA, England

[21] Appl. No.: 76,621

[22] Filed: Jul. 23, 1987

[51] Int. Cl.⁴ .......................... H04Q 1/00; E05B 49/00
[52] U.S. Cl. ........................... 340/825.31; 340/825.56; 340/712; 341/23
[58] Field of Search ................ 340/792, 825.31, 825.3, 340/365 VL, 712, 543, 63, 724, 726, 825.56, 542; 70/278; 361/172; 307/10 AT; 341/23

[56] References Cited

U.S. PATENT DOCUMENTS

| 3,751,718 | 8/1973 | Hanchett, Jr. ........................ 70/278 |
| 3,885,408 | 5/1975 | Clark, Jr. ................................ 70/278 |
| 4,333,090 | 6/1982 | Hirsch . |
| 4,336,530 | 6/1982 | Koike et al. . |
| 4,348,660 | 9/1982 | Robertsen et al. .......... 340/365 VL |
| 4,386,351 | 5/1983 | Lowdenslager ................... 340/792 |
| 4,479,112 | 10/1984 | Hirsch ............................ 340/825.31 |
| 4,502,048 | 2/1985 | Rehm . |
| 4,709,387 | 11/1987 | Masuda ............................... 340/712 |
| 4,724,423 | 2/1988 | Kinoshita .......................... 340/365 S |

FOREIGN PATENT DOCUMENTS

| 0115343 | 8/1984 | European Pat. Off. . |
| 0147837 | 7/1985 | European Pat. Off. .............. 70/278 |
| 0134317 | 7/1985 | Japan ................................... 340/712 |
| 1385416 | 2/1975 | United Kingdom . |
| 2148078 | 5/1985 | United Kingdom ................ 340/724 |

Primary Examiner—Donald J. Yusko
Assistant Examiner—Edwin C. Holloway, III
Attorney, Agent, or Firm—Jerry A. Miller

[57] ABSTRACT

For use in access-control apparatus, the character-to-key assignment in a keypad for inputting an authorization or identification code is changed at specified events so as to scroll the array of assigned characters. The security offered by the device against the inputted characters being surreptitiously "read" by observation of the keys actuated is thereby enhanced but without the operating difficulties encountered with keypads in which the character-to-key assignment is changed on a purely random basis.

4 Claims, 2 Drawing Sheets

ACCESS-CONTROL APPARATUS

BACKGROUND

1. Field of the Invention

The present invention relates to access-control apparatus including a device comprising an array of selectively-actuable keys for the entry of authorisation or identification data represented as a sequence of characters. The invention is in particular concerned with the secure inputting of identification or authorization data comprising a sequence of digits and/or letters where, for example, it is necessary to enter a secret code of this kind into an identification device in order to unlock a safe or strongroom, gain admission to a building, use a cash dispensing machine, log-on to a computer network, or obtain access to some other service, and it is an aim of the invention to provide a data entry device suitable for such service which can be operated in such a manner as to make it impractical for an unauthorised person to discover or reproduce the entered data by observing the positions of the actuated keys during the data-entry process and/or inspecting the array of keys afterwards.

2. Background of the Invention

In a conventional keypad as used for the entry of authorisation or identification codes for access-control purposes, there is an array of keys to each one of which is permanently assigned a respective numeric character 0–9, and usually one or more specific "function" keys. From a security standpoint, however, there are certain disadvantages in a fixed character-to-key assignment. Firstly, in cases where there is repetitive legitimate entry of a given code, for example in a code-recognition safe or strongroom door lock, it may be possible for an unauthorised person to gain information on the composition of that code by studying the wear pattern of the keys, or even "fingerprinting" the keys.

Furthermore, a bystander who observes a person entering a code may be able to recognise, and make fraudulent use of, that code simply by noting the position and order of the keys being actuated. In order to overcome these problems it is known, eg from U.S. Pat. Nos. 4,333,090 and 4,502,048, to assign the characters to the keys electronically in a random pattern and to change the random pattern after each successive actuation or series of actuations of the keys, with the assigned key values at any one time being displayed in relation to the keys preferably in a manner to be seen only by the person who is actually operating them. With this arrangement all of the keys will tend to be used and worn at a similar rate whatever the composition of the code(s) commonly entered. Furthermore, a bystander who observes the actuation of a series of keys but cannot see the assigned key values at that time will not be able to determine the code entered thereby because there is no permanent relationship between the keys and their characters.

While this "randomizing" of the character-to-key assignment provides useful protection against surreptitious reading of entered data it does have a drawback of its own. That is to say the very nature of the changing random pattern of characters can make it difficult for a person using the device legitimately to locate the specific character he wishes to enter at any one time, thereby increasing the time taken to enter the code and the probability of an incorrect entry being made.

SUMMARY OF THE INVENTION

The present invention seeks to provide a key-based data entry device for access-control apparatus which is capable of providing a similar level of security to the "random" keypads referred to above but which is easier for legitimate operators to use. Accordingly the invention resides in access-control apparatus including a device for the entry of authorisation or identification data represented as a sequence of characters, said data entry device comprising: an array of selectively actuable keys for inputting members of a character set; means for assigning respective said characters to respective said keys and for changing the character-to-key assignment at specified events in such a manner as to scroll the array of assigned characters; and means for displaying the currently-assigned characters in relation to the respective keys.

By "scrolling" the array of assigned characters is meant a stepwise shifting of the lines of characters within the array in any coordinate direction thereof. After each scroll, therefore, there is a total re-assignment of the characters to the keys but nevertheless the characters within each scrolled line remain in the same relative positions, so facilitating the visual search required of an operator to locate any specific character as compared with a purely random array. Furthermore, at least in the case where there is uni-directional scrolling, it is not necessary to programme every key and display to be capable of assignment to every character in the set (as is required in the "random" keyboards), but only to those characters which appear at corresponding positions in each line which is scrolled past a respective key, thus simplifying the circuit design.

An embodiment of the invention will now be more particularly described, by way of example, with reference to the accompanying drawings

DESCRIPTION OF THE INVENTION

Figure 1:
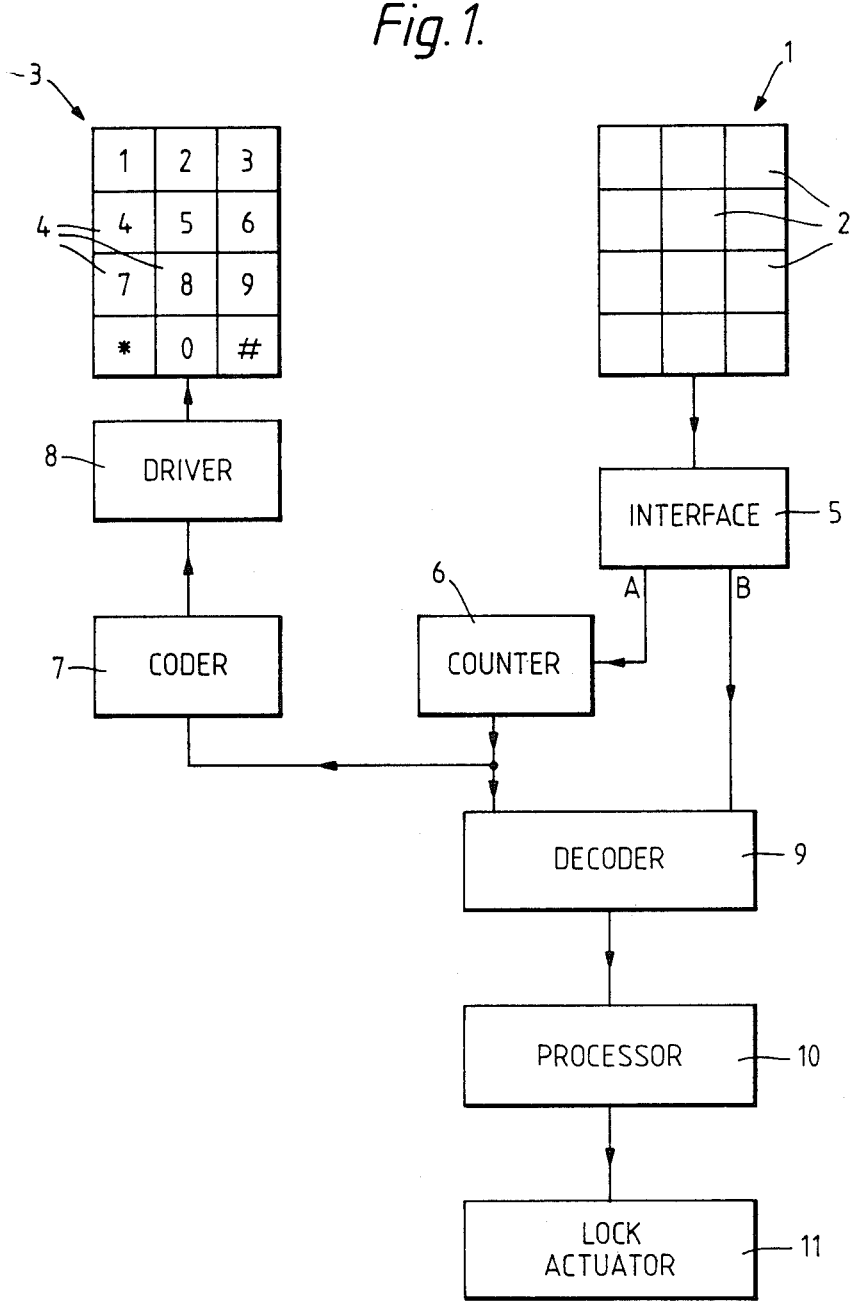
FIG. 1 is a simplified block diagram of an access-control apparatus including means for providing a scrolling key sequence in accordance with the invention.

In the example of FIG. 1 reference numeral 1 designates a keypad comprising an array of twelve separately-actuable keys 2 by which a multi-digit authorisation code can be entered for the purpose of actuating an electromechanical safe or strongroom door lock. Associated with the keypad 1 is an annunicator 3 comprising an array of twelve electronic displays 4 by which to indicate the characters or functions assigned to the respective keys 2 at any time. Although the annunicator 3 is shown separate from the keypad 1 for ease of illustration in FIG. 1, in practice each display 4 will be structually integrated within its respective key 2, and preferably in a manner to restrict the field of view of each display to a narrow angle so that it can be observed only by the person operating the keypad at any one time, as known from the prior art.

Figures 2A, 2B, 2C, 2D:
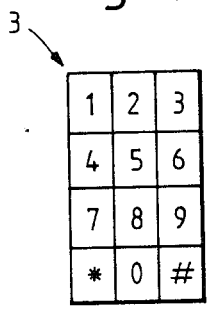
FIGS. 2(a)–2(d) illustrate successive stages in the scrolling sequence.

FIG. 1 and FIG. 2 (a) indicates the state of the annunicator 3 which is assumed to pertain, in this example, at the commencement of a particular operation to enter an authorisation code, in which the characters 0–9 together with a "LOCK" function indicated "#" and an "UNLOCK" function indicated "*" are assigned to the keys 2 in a purely conventional pattern. After each actuation of a key 2 to enter the successive characters of the authorisation code, however, the characters and functions are re-assigned to the keys as indicated by FIGS. 2(b)-(d) for successive actuations, i.e. so as to scroll the horizontal lines of characters upwards by one step at a time, with the topmost line reappearing as the lowermost line in the next pattern.

To achieve this function, the keypad has an associated interface 5 which provides a single pulse on an output line A each time that any key is operated, and a signal on an output line B to indicate the particular key which was operated. The pulses on line A are fed to a counter 6 which, in this example, has four states, corresponding to the number of horizontal lines in the keypad array. The count output from the counter 6 is converted by a coder 7 into the new display pattern, and the display is correspondingly altered through an annunciator driver 8. The output on line B from the interface 5 is also taken, together with the signal from the counter 6, by a decoder 9, to give an output from the decoder which indicates the assigned value of the key which has just been operated. The successive signals from the decoder 9, which represent the characters making up the entered authorisation code, are passed to a processor 10 where the code, if correct, is validated, and an electromechanical actuator 11 is consequently operated to open the lock.

It will be appreciated that the repositioning of the characters during the above-described process will make it impossible for any bystander to read any data input by observing the position and order of the keys actuated without knowledge of the character-to-key assignment at each stage, and will similarly confuse any attempts to read the wear pattern of the keys. At the same time, however, an operator observing the scrolling process and presented with key designations according to any one of FIGS. 2(a) to (d) will have little difficulty in locating a desired key at any stage of data entry.

In the simple implementation of the invention described above the counter 6 is advanced by one count each time a pulse is received on line A. In a more complex form the counter could be a pseudo random binary generator so that it would be advanced by a random count each time a pulse is received—thereby scrolling the array of characters and functions by a corresponding number of steps. It is also possible to modify the coder 7 and decoder 9 so that scrolling can take place in either a horizontal or vertical direction; upwards, downwards, left or right. Instead of scrolling after each individual key actuation, it may alternatively be arranged to occur after the entry of a complete code, or in response to a separate control input. The starting condition of the character-to-key assignment for any data input may also be at any point within a total scrolling sequence.

Although described above in terms of a purely numeric keypad, the invention is equally applicable to keyed input devices for alpha-numeric or any other class of characters.

I claim:

1. Access-control apparatus including a device for the entry of authorization or identification data represented as a sequence of characters, and means for providing means for providing access in response to the recognition of such data entered through said device; said data entry device comprising: rectangular array of selectively actuable keys for inputting members of a character set, the keys being equal in number to the number of characters in that set; means for assigning respective members of said character set to respective said keys; means for changing the character-to-key assignment of that same character set at specified events by scrolling the array of assigned characters in the sense that lines of the said characters are shifted stepwise in a coordinate direction of the array; with the line at the leading edge of the array in that direction reappearing at the opposite edge of the array, whereby all of the characters appear in changed positions within the array after each shift but the relative positions of the characters within each individual said line are retained; and means for displaying the currently-assigned characters in relation to the respective keys.

2. Apparatus according to claim 1 wherein the data entry device comprises means to scroll the characters successively in a constant coordinate direction of the array.

3. Apparatus according to claim 1 wherein the data entry device comprises means to scroll the characters successively by a constant number of steps.

4. Apparatus according to claim 1 wherein the data entry device comprises means to scroll the characters after each successive key actuation.

* * * * *

UNITED STATES PATENT AND TRADEMARK OFFICE
CERTIFICATE OF CORRECTION

PATENT NO. : 4,857,914

DATED : August 15, 1989

INVENTOR(S) : Keith Rex Thrower

It is certified that error appears in the above—identified patent and that said Letters Patent is hereby corrected as shown below:

In claim 1, line 18, delete "means for providing".

In claim 1, line 20, after "comprising:", insert "a".

In claim 1, line 29, after "array", delete ";" and insert ",".

Signed and Sealed this

Eleventh Day of September, 1990

Attest:

HARRY F. MANBECK, JR.

*Attesting Officer*  *Commissioner of Patents and Trademarks*